Dec. 31, 1935.  G. TAUSCHEK  2,026,330
READING MACHINE
Original Filed May 27, 1929
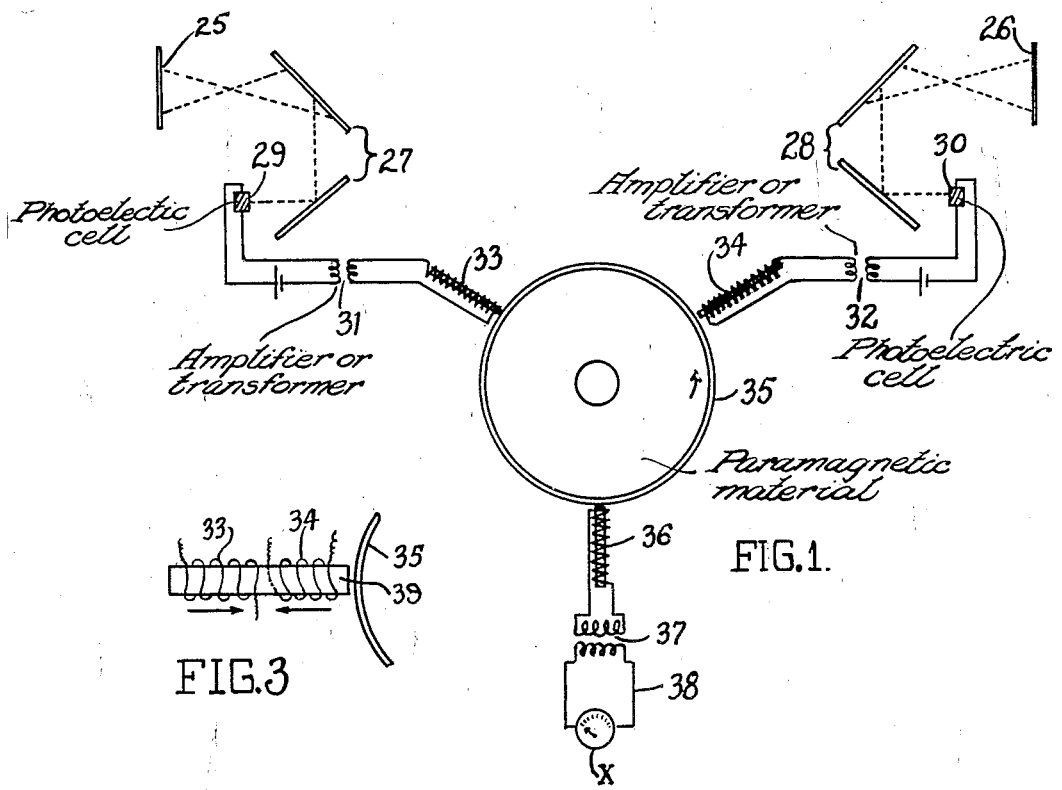
FIG.1.
FIG.3.
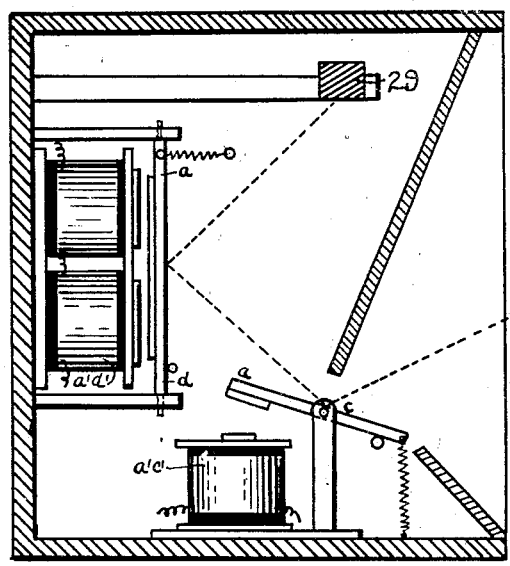
FIG.2
INVENTOR
GUSTAV TAUSCHEK
BY *Fraul W Lowuitzer*
ATTORNEY

UNITED STATES PATENT OFFICE 2,026,330

READING MACHINE

Gustav Tauschek, Mountain Lakes, N. J.

Original application May 27, 1929, Serial No. 366,466. Divided and this application June 3, 1932, Serial No. 615,069. In Austria May 30, 1928

21 Claims. (Cl. 250—41.5)

This invention relates to a machine which by the action of rays of radiant energy in connection with a ray sensitive device is capable of scanning a representation, such as a picture, to examine the same.

This application is a division of applicant's copending application Serial Number 366,466, filed May 27, 1929.

The general object of the present invention is to provide an improved means for reading or examining a picture generally or representations on a record or any other material. More specifically it is an object to provide an improved form of scanning device which involves the use of light rays in connection with a single light sensitive device, such as a photo-electric cell.

Another object of the invention is to provide such a scanning device in duplicate whereby the indications or "picture points" making up a representation may be compared with indications or picture points on another for the purpose of making a comparison. Such an arrangement is materially useful in comparing a selected representation with an original representation to determine whether the first is a counterfeit, although other uses are apparent.

More specifically it is an object to determine, on a picture, representation, or other object, the presence of a point differing from its neighbors with respect to its ray reflecting or transmitting property and to indicate such fact by an electromagnetic effect.

It is a further object to compare the electromagnetic effect created by a picture point of one representation with the electro-magnetic effect created by a similarly placed picture point of another representation, and to indicate such fact thereby indicating a likeness in the particular points examined.

In order to secure the objects of the invention the arrangement constructed according to the present invention is provided with a suitable ray responsive device such as a photo-electric cell, in which the electric conducting capacity is varied by light or other rays of radiant energy transmitted according to certain defined points making up the indication or picture to be examined to direct or control certain operations.

It is well known that any picture or representation may be broken up into multiple points each of which may be either a light or dark point herein known as a "picture point" to alter the resistance of the photo-electric cell by reflected or transmitted light from the point. By the employment of an image divider, the various areas of the representation may be examined by scanning the picture points permitting a single photo-electric cell to be employed. The currents resulting from the change in resistance of the photo-electric cell effect the magnetization of a suitable element.

When the arrangement thus described is co-ordinated with a like scanning device two representations may be compared by comparing their composite picture points. In this case the magnetization of the element, upon the presence of a light point in one representation is in the illustrative arrangement compensated or neutralized by the magnetic effect produced on the element upon the presence of a corresponding light point in the other representation compared therewith.

The invention will be clearly understood when the following description is taken in connection with the accompanying drawing in which:

Fig. 1 is a diagrammatic representation of the improved scanning means and shown arranged in duplicate to make it possible to compare representations.

Fig. 2 is the disclosure of an arrangement of a well known image divider that may be employed to practice the present invention.

Fig. 3 is a disclosure of a modified arrangement of certain coils used.

With reference to the details disclosed in Fig. 2 it is pointed out that the same is a representation of part of the image divider, as for instance disclosed in the publication "Miniatur Bibiothek" No. 234, published by Albert Otto Paul, Leipzig, Germany, and is reproduced for the sake of convenience.

Such an arrangement is known as the Szcepanski mirror scanning device, and as it is well known its construction and operation will be only generally described herein.

In general, it is stated that the picture or representation to be read is exhibited at G against which light is directed. This representation is then divided into individual picture points, each one after the other scanned to influence a photo-cell.

The division of the picture at G into picture points is effected by two mirrors $ac$ and $ad$ and each consists of a narrow reflecting line. To a small steel plate which is the armature of a magnet $a'c'$ there is attached the mirror $ac$ which is disposed at right angles to the plane of the drawing. By any suitable means the magnet $a'c'$ causes vibration of the mirror $ac$ and the latter will reflect only line shaped sections of the picture, and as *ac* vibrates very rapidly (about a horizontal axis in Fig. 2) all the line sections of the representation, from top to bottom, and bottom to top, will be reflected by the mirror in succession, such line sections being parallel to the axis of vibration, and horizontal when the mirror *ac* vibrates about a horizontal axis as shown.

Perpendicular to the plate *ac* a second mirror *ad* is provided and is attached to a vibrating armature of magnet *a'd'*. This second mirror has a single vertical narrow reflecting surface or reflecting line parallel to the vertical axis about which the mirror *ad* vibrates. The mirror *ac* will thus throw a horizontal beam or line of light, corresponding to successive horizontal elements of the picture G, across the vertical reflecting line of the mirror *ad*. Since these two lines intersect at only one point, by regulating the vibration of both mirrors, and providing for a slight difference between the two, it is possible to divide the picture into 160,000 picture points, if each mirror vibrates 400 times in the course of one tenth of a second.

The light at the point of intersection is reflected by mirror *ad* and is directed towards a photo-electric cell 29 of the present machine.

With the above general description the invention embodying some of the elements of the above described device will be now more clearly understood.

Referring to Fig. 1 it will be observed that two representations to be compared, 25 and 26, which may comprise, for instance, paper currency one of which is genuine and the other possibly a counterfeit, are positioned as explained, so that they are divided in their picture points by two image dividers which include the vibrating pairs of mirrors 27 and 28. The brightness variations of the picture points are transformed by the photo-electric cells 29 and 30 into electric currents. The photo-electric cells thereby vary the current values and such currents are strengthened by means of any suitable amplifiers or transformers 31 and 32. The currents, by means of coil windings 33 and 34, are converted into magnetism to magnetize sections of a rotatable steel-roller 35.

The coils 33 and 34 are reversely wound and are of such proportions that the magnetic effect upon a section of the steel-roller 35 created by one coil is compensated, balanced or neutralized by the magnetic effect created by the other coil whenever corresponding picture points of the two representations 25, 26 produce substantially like effects on the respective cells 29, 30.

A third coil 36, causes, by means of any magnetic effect retained in the roller 35, upon the absence of like picture points, a current which is strengthened by a transformer or amplifier 37 to be induced in a control circuit 38 in which there is included some suitable manifesting device, such as a galvanometer X.

The operation of the device is as follows:

The division of the picture 25 takes place a moment later than the division of the picture 26 and this difference of time is so selected that the spot or portion of roller 35 magnetized by a picture point of one representation is disposed opposite the coil 33 when the presence of a corresponding picture point is determined in the other representation. If the picture points produce substantially identical effects on the cells 29, 30, the magnetization of the corresponding spot or portion of the roller will be compensated or neutralized. However, if like picture points are not present in identical places of both representations the roller 35 remains irregularly magnetized and causes a current to be induced in coil 36 by an electro-magnetic effect which induced current subsequently leads to a control action in the control circuit 38 such as a representation on the indicating device or operating means X. The supplemental scanning device indicated at 28 and the parts associated therewith constitute a controlling means adapted to control the influence which the circuit 29, 31, 33 exerts on the operating means X through the roller 35.

This arrangement can be modified, for instance, by combining the opposite windings of coils 33 and 34, as shown in Fig. 3, on a single core 39 which would irregularly magnetize a spot or portion of roller 35 only if the currents in the windings did not compensate or neutralize each other in view of the non-conformity of the picture points.

By dispensing with the coil 36 and the associated parts 37, 38, X and replacing the photo-electric cell 30 by an image regenerator (for instance a Kerr cell), such as used in apparatus for photo-transmission, the machine could be used for the reproduction of visible, or so to speak, stored images or pictures.

One of the scanning devices, for instance 27, produces varying electrical effects in the respective coil (33), and from these electrical effects are derived other effects (in this case, magnetic effects in the roller 35) which are compared with a standard (in the particular example, the magnetic effects produced in the roller 35 by the other scanning device (28) and its coil (34)). The roller 35 constitutes a movable element of magnetic material, to which magnetizing forces are applied by means, represented by the coils 33, 34, which are controlled or energized by individual ray-sensitive devices 29 and 30 respectively. The resultant of the action of the electric currents energizing the two coils 33, 34 is ascertained by the action of the operating or indicating means X in the control circuit 38. The parts 31, 33, 35, 36 and 37 together constitute operative means interposed between the ray-sensitive means 29 and the control circuit 38. The parts 28, 30, 32, 34 constitute a comparison device for comparing the points of the representation or object 25 with those of the object or representation 26.

What is claimed is as follows:

1. A method of determining, at a predetermined place of a representation or other object, the presence of a point differing from its neighbors with respect to its action on rays of radiant energy, which consists in projecting rays of radiant energy from said points successively in a definite direction, to produce variations in the intensity of said rays whenever such points differ with respect to their action on said rays, converting such variations into electric current impulses, recording such impulses by electro-magnetism, and actuating, by means of the magnetic record thus obtained, an indicator revealing the presence of such a point at said predetermined place.

2. The combination of a ray-controlling device for scanning successively different points of an object, a ray-sensitive means controlled by said scanning device, a control circuit controlled by said means, and a comparison device for comparing the points of said object with those of another object to be compared therewith, said comparison device likewise controlling said circuit.

3. The combination of a ray-controlling device for scanning successively different points of an object, a ray-sensitive means controlled by said scanning device, a comparison device for comparing the scanned points of said object with those of another object, control means influenced both by said ray-sensitive means and by said comparison device, and a control circuit controlled by said control means.

4. The combination of a ray-controlling device for scanning successively different points of an object, a ray-sensitive means controlled by said scanning device, a comparison device for comparing the scanned points of said object with those of another object, a movable magnetic element exposed to magnetizing influences exerted both by said comparison device and by said ray-sensitive means, and a control circuit controlled by said element.

5. The combination of a ray-controlling device for scanning successively different points of an object, a ray-sensitive means controlled by said scanning device, a control circuit controlled by said means, and a comparison device for comparing the scanned points of said object with those of another object and influencing the operativeness of said control circuit.

6. The combination of a device for scanning successively different points of an object, a ray sensitive cell, a circuit, said cell adapted to produce a current in said circuit in accordance with the variations in the rays transmitted by the scanning device, an operating means and a controlling means comprising a supplemental scanning device adapted to control the influence of the said circuit upon the operating means.

7. A method of comparing two objects having points which differ with respect to their action on rays of radiant energy, which consists in examining by rays of radiant energy successive points of both objects to effect variations in the intensity of said rays whenever successive points of the same object differ with respect to their action on said rays, converting, for each of said objects, the said variations into a varying electric current, and ascertaining the resultant of those two portions of said two electric currents which are produced by the action of rays of radiant energy from two correspondingly located points of said objects.

8. A method of comparing two objects having points which differ with respect to their action on rays of radiant energy, which consists in examining by rays of radiant energy successive points of both objects to effect variations in the intensity of said rays whenever successive points of the same object differ with respect to their action on said rays, converting, for each of said objects, the said variations into a varying electric current, producing magnetic effects by each of said currents, and ascertaining whether or not compensation exists between the magnetic effects resulting from those two portions of said two electric currents which are produced by the action of rays of radiant energy from two correspondingly located points of said objects.

9. The combination of a circuit, means in said circuit actuated when a definite electrical condition exists in said circuit, a cell sensitive to rays of radiant energy impinging thereon, a device for scanning successively different points of an object by rays of radiant energy to affect said cell by changes in the character of said rays as the scanning action passes to different points of said object, means responsive to the effect of radiant energy on said cell, to change the electrical condition in said circuit, and a controlling means for determining whether the electrical condition in said circuit shall be such as to actuate the first-mentioned means.

10. The combination of a device for scanning successively different parts of an object by rays of radiant energy, a ray-sensitive means controlled by said scanning device, a control circuit, operative means interposed between said ray-sensitive means and said circuit to control the latter, and control means controlled by another object and influencing said operative means to vary the effect of said operative means on the control circuit according as corresponding parts of the two objects are substantially identical in their action with respect to said rays or not.

11. The combination of a device for scanning successively different parts of an object by rays of radiant energy, a ray-sensitive means controlled by said scanning device, a control circuit, operative means interposed between said ray-sensitive means and said circuit to control the latter, and control means controlled by another object and influencing said operative means to affect the control circuit in a definite predetermined manner whenever that particular part of the first-mentioned object which is being scanned at the moment is substantially identical, in its action on said rays, with the corresponding part of the other object.

12. In a machine for comparing a pair of pictures or other objects, the combination with a scaning device for scanning successively different points of one picture or other object, a supplemental scanning device for scanning successively different points of another picture or other object, an element of magnetic material, and means under control of said scanning devices jointly for effecting the magnetization of said element, or for preventing the magnetization of said element, dependent on whether corresponding points of the compared pictures or other objects are unlike or alike.

13. The invention according to the above claim 12 in which there is included in the combination an operating circuit, means in said circuit actuated when an impulse of current flows in said circuit, and means actuated by the magnetism imparted to said element, to cause a current flow in said circuit.

14. The combination of an element of magnetic material, two scanning devices each arranged to operate on one of two objects, means for applying magnetizing forces to said element, and individual devices controlled by the respective scanning devices, for energizing said means to magnetize a particular portion of said element in accordance with the resultant of the effects of said individual devices.

15. The combination of a movable element of magnetic material, two scanning devices each arranged to operate on one of two objects, two separate means for applying magnetizing forces to said element, said means being located adjacent to different portions of said element, and individual devices controlled by the respective scanning devices for energizing said means, the movement of said element being so timed relatively to the operation of the two scanning devices that the same portion of said element will be subjected first to the magnetizing forces controlled by one of said scanning devices when such scanning device is operating on a definite point of one object, and then to the magnetizing forces controlled by the other scanning device, when the latter is operating on the corresponding point of the other object.

16. The combination of a control circuit, means for scanning corresponding points of two objects successively by rays of radiant energy, and means for controlling said circuit differently according as said corresponding points are alike or unlike with respect to their effect on said rays.

17. The combination of a control circuit, means for scanning corresponding points of two objects successively by rays of radiant energy, and means for controlling said circuit, such controlling means being controlled by the effect of radiant energy directed by the scanning means, in such a manner that there will be no action of said controlling means on the control circuit when corresponding points of the two objects are substantially alike with respect to their effect on said rays.

18. The combination of two devices operating with rays of radiant energy to scan successively different points of two objects, two ray-sensitive devices controlled by the rays directed by said scanning devices, and a control circuit controlled by both of said ray-sensitive devices.

19. The combination of devices for scanning corresponding points of two objects successively by rays of radiant energy, two ray-sensitive devices controlled by the rays directed by said scanning devices, two means controlled by the respective ray-sensitive devices in such a manner that such means will produce effects compensating each other whenever corresponding scanned points of the two objects are substantially alike with respect to their effect on said rays, and a control circuit controlled by both of said means.

20. The method which consists in scanning successively different points of an object with rays of radiant energy, converting the resulting variations in the characteristics of said rays into varying electrical effects, and comparing these effects with a standard.

21. The method which consists in scanning successively different points of an object with rays of radiant energy, converting the resulting variations in the characteristics of said rays into varying electrical effects, deriving from these electrical effects, other effects varying in a similar manner, and comparing these derived effects with a standard.

GUSTAV TAUSCHEK.